United States Patent
Epstein

(10) Patent No.: US 7,134,145 B1
(45) Date of Patent: Nov. 7, 2006

(54) REGISTERING COPY PROTECTED MATERIAL IN A CHECK-OUT, CHECK-IN SYSTEM

(75) Inventor: Michael A. Epstein, Spring Valley, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 306 days.

(21) Appl. No.: 09/548,728

(22) Filed: Apr. 13, 2000

Related U.S. Application Data

(60) Provisional application No. 60/131,993, filed on Apr. 30, 1999.

(51) Int. Cl.
H04L 9/32 (2006.01)
H04L 9/00 (2006.01)

(52) U.S. Cl. .............. 726/27; 726/7; 713/173; 713/193

(58) Field of Classification Search ........ 713/173, 713/165, 168, 200–202, 172, 189, 193; 707/9; 702/35; 705/50–59
See application file for complete search history.

(56) References Cited

U.S. PATENT DOCUMENTS

| | | | | |
|---|---|---|---|---|
| 4,890,323 A | * | 12/1989 | Beker et al. | 705/67 |
| 5,251,315 A | * | 10/1993 | Wang | 707/8 |
| 5,390,297 A | | 2/1995 | Barber et al. | 395/200 |
| 5,568,552 A | * | 10/1996 | Davis | 705/59 |
| 5,638,513 A | * | 6/1997 | Ananda | 713/202 |
| 5,754,763 A | * | 5/1998 | Bereiter | 713/201 |
| 5,787,175 A | | 7/1998 | Carter | 380/25 |
| 5,935,246 A | * | 8/1999 | Benson | 713/200 |
| 6,173,400 B1 | * | 1/2001 | Perlman et al. | 713/172 |

FOREIGN PATENT DOCUMENTS

| | | |
|---|---|---|
| EP | 0640899 A1 | 3/1995 |
| WO | WO 9811487 | 3/1998 |
| WO | WO 9834173 | 8/1998 |

OTHER PUBLICATIONS

Fryer et al, "Microsoft Press Computer Dictionary", 1997, Microsoft Press, 3rd Edition, p. 84.*
White, "How Computers Work", Sep. 1999, Que Corporation, p. 126,127.*

* cited by examiner

Primary Examiner—Christopher Revak

(57) ABSTRACT

In a limited-copy protection scheme, a check-out/check-in system is configured to a) verify that the receiving device is a certified conforming device, and b) verify that the device that checks-in content material is the same device that checked-out the content material. The verification of the receiving device is effected via a conventional certification process. The verification that the same device is used for check-in and check-out is effected via a secure challenge-response protocol. As contrast to a conventional contemporaneous challenge-response protocol, the system provides a challenge that is specific to the receiving device when the content material is checked-out, and verifies the appropriate response when the content material is checked-in. Because the challenge-response is specific to the receiving device, only the device that receives the challenge when the content material is checked-out can provide the appropriate response when the content material is checked-in.

14 Claims, 2 Drawing Sheets

REGISTERING COPY PROTECTED MATERIAL IN A CHECK-OUT, CHECK-IN SYSTEM

This application claims the benefit of U.S. Provisional Application No. 60/131,993 filed 30 Apr. 1999.

BACKGROUND OF THE INVENTION

1. Field of the Invention

This invention relates to the field of consumer devices, and in particular to techniques for preventing or discouraging the illicit duplication of copy protected material.

2. Description of Related Art

Techniques are continually being proposed and developed to prevent or discourage the illicit duplication of copy-protected material, such as commercial music recordings. These techniques generally attempt to limit the number of copies that can be made from a legitimate copy of the copy-protected material. At the same time, the purchaser of this legitimate copy expects to have unlimited rights for copying this material for his or her private purposes. For example, the typical purchaser has access to multiple means for playing and recording the material, and expects to be able to play the purchased material on each of these means, without constraints.

Increasingly common in the art is the use of flash memory cards to record content material for playback on small portable devices. These flash memory cards, or similar electronic memory devices, have an advantage over conventional recording media such as discs or tapes, in that they contain no moving parts and are thus more reliable and robust. Similarly, the playback devices for these memory cards need not contain movement mechanisms and are therefore also more reliable, robust, and, in general, less expensive than conventional players. The electronic memory devices and corresponding players are also generally much smaller than conventional discs or tapes and corresponding players, and generally consume less power, further increasing their suitability for use as portable playback systems.

One method for limiting the ability to copy the content material is a "check-out/check-in" system. In this, as in other protection schemes presented herein, it is assumed that the copying and playback devices are "conforming" devices, in that they conform to the standards used to protect copy-protected material. When a copy of the material is made from a providing device to a portable medium, the conforming providing device prevents additional copies from being made until the portable medium containing the copy is returned to the providing device. That is, the check-out/check-in system provides a "one-at-a-time", or an "at-most-N-at-a-time", copy scheme to limit the number of simultaneously available copies of protected content material.

A check-out/check-in system is susceptible to a variety of attacks intended to overcome the security provided by a check-out/check-in system. The most straightforward attack is one in which a non-conforming device is used to receive the material. After receiving the material, the non-conforming device provides unlimited copies. Another attack is one in which a non-conforming device "checks-in" material that another device received. A conforming device can receive/check-out the material, the non-conforming device can "check-in" the material, and another conforming device can then receive the material, because the check-out/check-in system believes that the other copy has been returned. In this manner, an unlimited number of copies can be made to conforming devices, such as the aforementioned flash memory cards.

BRIEF SUMMARY OF THE INVENTION

It is an object of this invention to provide a reliable check-out/check-in system and method for limiting the number of copies of protected content material that are simultaneously available. It is a further object of this invention to provide a reliable system and method for assuring that protected content material is provided only to devices that conform to copy protection standards established for protecting the content material. It is a further object of this invention to provide a reliable system and method for assuring that the device that checks-out content material is the same device that checks-in the content material.

These objects and others are achieved by a check-out/check-in system that is configured to a) verify that the receiving device is a certified conforming device, and b) verify that the device that checks-in content material is the same device that checked-out the content material. The verification of the receiving device is effected via a conventional certification process. The verification that the same device is used for check-in and check-out is effected via a secure challenge-response protocol. As contrast to a conventional contemporaneous challenge-response protocol, the system provides a unique challenge that is specific to the receiving device when the content material is checked-out, and verifies the appropriate response when the content material is checked-in. Because the challenge-response is specific to the receiving device, only the device that receives the challenge when the content material is checked-out can provide the appropriate response when the content material is checked-in.

BRIEF DESCRIPTION OF THE DRAWINGS

The invention is explained in further detail, and by way of example, with reference to the accompanying drawings wherein.

Throughout the drawings, same reference numerals indicate similar or corresponding features or functions.

DETAILED DESCRIPTION OF THE INVENTION

This invention is based on the premise that a reliable check-in/check-out system has two fundamental requirements. Such a system requires a reliable means of verifying that the receiving device is a certified conforming-device. Otherwise, the copy provided to a potentially non-conforming device may be illicitly reproduced, thereby obviating the copy protection provided by a check-out/check-in system. Additionally, the system requires a reliable means of verifying that the checked-in material is being returned from the same certified conforming-device that initially checked-out the material. Otherwise, a non-conforming device can be used to 'check-in' material that another device, including a conforming device, received. Other security techniques, common in the art, may also be applied, for increased copy and distribution protection.

Figure 1:
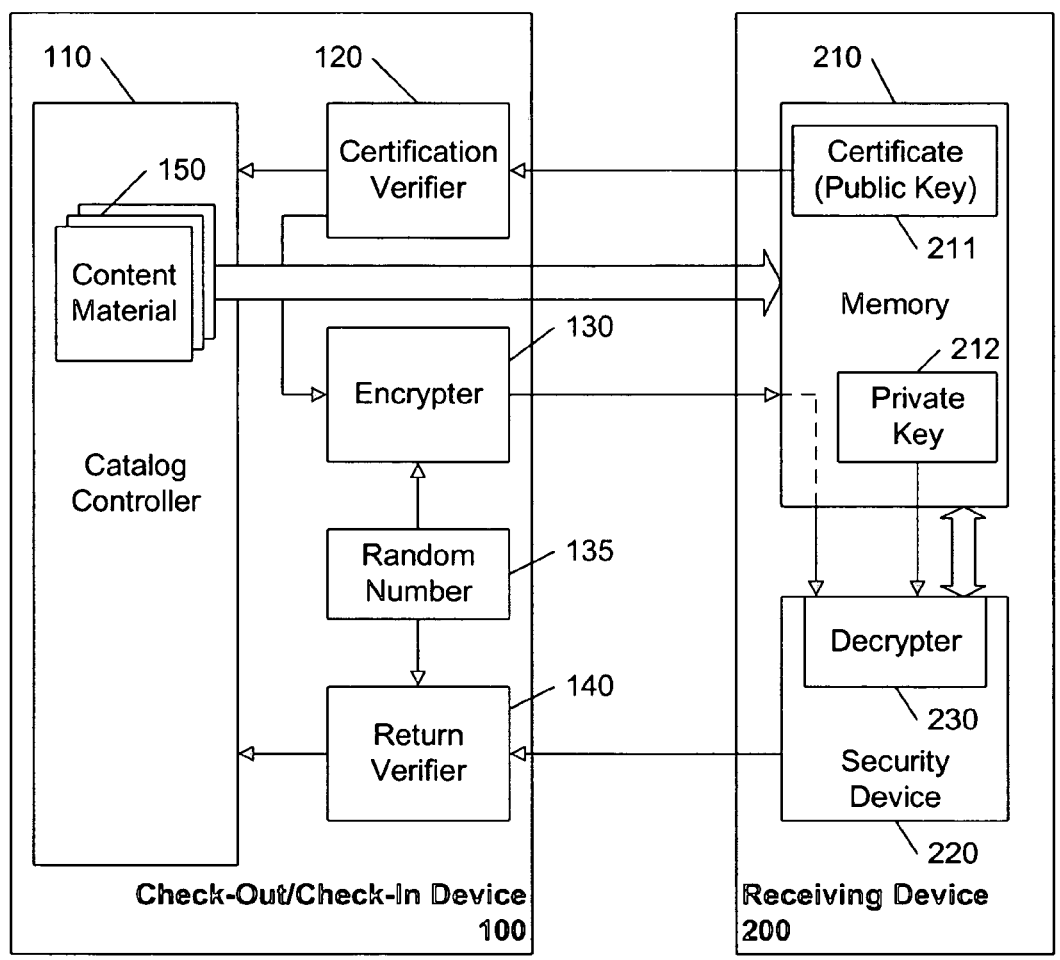
FIG. 1 illustrates an example block diagram of a check-out/check-in system in accordance with this invention.

FIG. 1 illustrates an example block diagram of a check-out/check-in system in accordance with this invention. The check-out/check-in system includes a check-out/check-in device 100 and a receiving device 200. The check-out/check-in device includes a catalog controller 110 that controls access to a catalog of content material 150 to certified receiving devices. The controller 110 limits the number of copies of each content material 150 that are simultaneously available. In a preferred embodiment, the controller 110 maintains a count of the number of copies of the content material 150 that have been provided to, or "checked-out" to, certified receiving devices, and refuses to provide additional copies when a pre-defined limit is reached. The check-out/check-in system allows a receiving device 200 to "return", or "check-in" a copy of the content material 150, so that it can be provided to another receiving device. The receiving device 200 is presumed to be a conforming device, and a "return" of the material 150 corresponds to a termination of access to the copy of the content material 150 by the receiving device 200, and the "return" is a notification to the check-out/check-in device 100 that the receiving device 200 has terminated the access. Upon receipt of the "return" notification, the check-out/check-in device 100 decrements the count of the number of copies of the content material 150 that have been provided to receiving devices, thereby allowing another copy of the content material 150 to be provided to a certified receiving device.

A conforming receiving device 200 includes a "certificate" 211 that is issued by a trusted authority to certify that the receiving device is a device that is configured to conform to standards that have been established to protect copy protected content material. This certificate 211 typically includes a public key of a public-private key pair that is associated with the receiving device 200, the identity of the receiving device, and a digital signature based on a private key that is associated with the trusted authority. The digital signature binds the identity of the receiving device to the public key to the public key of the receiving device. The receiving device 200 communicates this certificate 211 to a certification verifier 120 in the check-out/check-in device 100. The certification verifier 120 applies a public key associated with the trusted authority to verify a correspondence between the communicated public key and the identity and authenticity of the receiver by means of the digital signature in the certificate 211. Because only the trusted authority can be expected to provide a digital signature that can be verified by the trusted authority's public key, the proper verification of the digital signature is a certification that the receiving device 200 is an authorized recipient for protected content material.

When the certificate is verified, the catalog controller 110 provides/checks-out the selected content material 150 to the receiving device 200, provided that the selected content material 150 has not already been checked-out to the maximum number of simultaneous receivers, based on the count parameter discussed above. That is, for example, if the content material 150 is limited to a single-copy-at-a-time distribution, then the catalog controller 110 will check-out the content material 150 to the receiving device 200 if and only if no other receiving device has checked-out this content material 150 and has not yet returned it.

In accordance with this invention, when the catalog controller 110 provides the copy of the content material 150 to the receiving device 200, the catalog controller 110 also issues a secure "challenge" to the receiving device, using any of a number of challenge-response protocols. In the example embodiment, the challenge is an encryption of a random number 135, based on the aforementioned public key of the public-private key pair that is associated with the receiving device 200. The random number 135 is provided by any number of techniques common in the art, including a pseudo-random number generator, a selection from a list, and so on. As noted above, preferably the certificate 211 contains this public key, and the certification verifier 120 provides this certified public key to an encrypter 130 to effect the encryption of the random number 135. The receiving device 200 stores the challenge in its memory 210, along with the associated content material 150.

As in conventional transfer systems, the content material 150 is provided to the receiving device in a secure form. The content material 150 may be encrypted using the aforementioned public key of the receiving device, and subsequently decrypted by the receiving device using a decrypter 230 and the receiving device's corresponding private key 212. Alternatively, the content material 150 may be encrypted using a particular key, and this particular key is encrypted using the public key of the receiving device. The receiving device 200 decrypts the encrypted key using the private key 212, and uses the decrypted key to decrypt the content material 150. These and other techniques for communicating protected content material are common in the art.

When a user of the receiving device 200 decides to return/check-in the content material to the check-out/check-in device, to allow another device to receive a copy of the content material, the receiving device is placed in communication with the check-out/check-in device, and the check-in process is initiated. In accordance with this invention, when placed in a check-in state, a security device 220 in the receiving device 200 erases the selected content material 150 from its memory 210, or otherwise terminates access to this content material 150, and communicates a "response" to the aforementioned "challenge" that was received when the content material 150 was received. In the example embodiment, the decrypter 230 within the security device 220 decrypts the encrypted random number that was received, and communicates the decrypted random number to the return verifier 140 of the check-out/check-in device 100. The return verifier compares the received decrypted random number to the original random number 135 to verify that the receiving device 200 is the same device that received the content material 150. Note that because the receiving device is assumed to be the only device having access to the receiving device's private key 212, and the encryption of the random number 135, and the content material 150, is based on the receiving device's public key, only the receiving device can return a decrypted random number that matches the original random number 135.

As will be evident to one of ordinary skill in the art, the catalog controller will typically contain a variety of content material that can be checked-out, and will typically check-out selected content material to a variety of receiving devices. Not illustrated, the catalog controller 110 and/or the return verifier 140 will contain a list of each checked-out content material and the random number associated with each checked-out content material, to effectively manage the check-out/check-in process. In like manner, each content material may have a different limit to the number of copies that may be simultaneously provided, with some content material allowing an unlimited number of simultaneous copies, and the catalog controller 110 is configured to enforce each limit as required.

Figure 2:
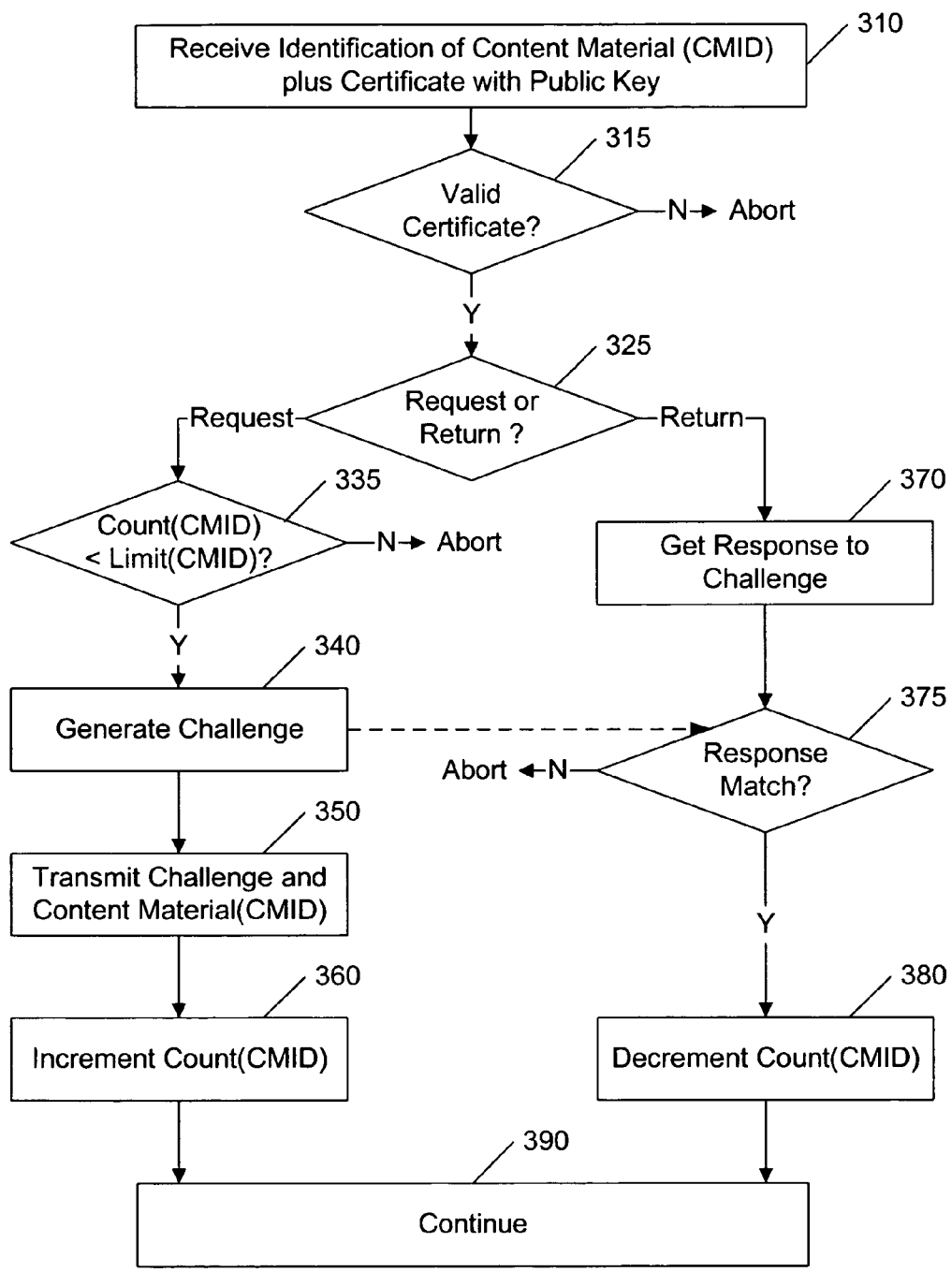
FIG. 2 illustrates an example flow diagram of a check-out/check-in system in accordance with this invention.

FIG. 2 illustrates an example flow diagram of a check-out/check-in system in accordance with this invention. At 310, the check-out/check-in device receives a transaction request that includes an identification of the content material, and a certificate that verifies that the receiving device is a conforming device. As discussed above, in a preferred embodiment, the certificate includes the public key of a public-private key pair that is associated with the receiving device. If, at 315, the certificate is determined to be invalid, the process is aborted; otherwise, the type of transaction is determined, at 325. If the transaction is a request to check-out content material, the current count of the number of copies of the requested content material is compared to the limit of the number of simultaneous copies permitted, at 335. If the number of currently checked-out copies is not less than the limit, the process is aborted. If the number of currently checked-out copies is less than the limit, a challenge is generated, at 340, and the challenge and the content material are transmitted to the receiving device, at 350. The current count of the number of checked-out copies is incremented, at 360, thereby corresponding to a check-out of the content material.

If, at 325, the transaction is a return/check-in of content material, the check-out/check-in device receives the response to the challenge that was given to the receiving device checked-out the content material, at 370. If the response is an appropriate response to the challenge, at 375, the current count of the number of checked-out copies of the content material is decremented, at 380, thereby corresponding to a "return" of the content material, and the process continues. If the response does not correspond to the challenge, at 375, the count is not decremented.

After incrementing or decrementing the count, or after aborting, the process continues at 390, typically by looping back to step 310, to await another transaction request. Note that the flow 310–325 can be modified to bypass the 're-certification' of the receiving device when content material is being returned, on the assumption that only a previously certified receiving device will be able to provide an appropriate response to the challenge, at 370.

The foregoing merely illustrates the principles of the invention. It will thus be appreciated that those skilled in the art will be able to devise various arrangements which, although not explicitly described or shown herein, embody the principles of the invention and are thus within the spirit and scope of the following claims.

I claim:

1. A method for limiting simultaneous copies of content material, comprising:
   communicating a copy of the content material to a receiving device,
   communicating a security challenge to the receiving device when the copy of the content material is communicated to the receiving device, and
   receiving a security response, based on the security challenge, from the receiving device when the copy of the content material is removed from the receiving device.

2. The method of claim 1, further including
   verifying a certification of the receiving device before communicating the copy of the content material to the receiving device.

3. The method of claim 1, further including
   maintaining a count of the simultaneous copies of the content material, including:
      incrementing the count when the copy of the content material is communicated to the receiving device, and
      decrementing the count when the security response is received from the receiving device, and
   wherein
   communicating the copy of the content material is dependent upon the count of the simultaneous copies.

4. The method of claim 1, further including:
   generating a random number, and
   encrypting the random number via a public key of a public-private key pair that is associated with the receiving device to form the security challenge, and
   wherein
   the security response includes the random number.

5. The method of claim 4, further including
   verifying a certification of the receiving device before communicating the copy of the content material to the receiving device, and
   wherein
   the certification of the receiving device includes a public key of the public-private key pair of the receiving device.

6. A check-out/check-in device comprising:
   a catalog controller that is configured to provide a limited number of simultaneous copies of content material to one or more receiving devices,
   an encrypter that is configured to provide a security challenge to a receiving device of the one or more receiving devices when the catalog controller provides a copy of the content material to the receiving device, and
   a return verifier that is configured to:
      receive a security response from the receiving device when the copy of the content material is removed from the receiving device, and
      notify the catalog controller whether the security response corresponds to an appropriate response to the security challenge.

7. The checkout/check-in device of claim 6, further including
   a certification verifier that is configured to verify a certification of the receiving device, and
   wherein
   the catalog controller is further configured to provide the content material in dependence upon the certification of the receiving device.

8. The check-out/check-in device of claim 6, wherein
   the catalog controller is further configured to maintain a count of the simultaneous copies of the content material,
   wherein,
   the catalog controller is configured to:
      increment the count when the copy of the content material is communicated to the receiving device, and
      decrement the count when the security response is received from the receiving device, and
      provide the copy of the content material in dependence upon the count of the simultaneous copies.

9. The check-out/check-in device of claim 6, wherein
   the encrypter is configured to encrypt a random number via a public key of a public-private key pair that is associated with the receiving device to form the security challenge, and
   the return verifier is configured to compare the security response to the random number to determine whether the security response corresponds to the appropriate response to the security challenge.

10. The check-out/check-in device of claim 9, further including
   a certification verifier that is configured to verify a certification of the receiving device, and wherein
the catalog controller is further configured to provide the content material in dependence upon the certification of the receiving device, and
the certification of the receiving device includes a public key of the public-private key pair of the receiving device.

11. A receiving device that receives content material and a corresponding security challenge from a check-out/check-in device, comprising:
   a memory that is configured to store the content material and the corresponding security challenge, and
   a security device that is configured to:
      erase the content material from the memory, and
      communicate a security response to the check-out/check-in device, based on the security challenge that is associated with the content material.

12. The receiving device of claim 11, wherein
the security device is further configured to communicate a certification of the receiving device to the check-out/check-in device to enable the check-out/check-in device to provide the content material to the receiving device.

13. The receiving device of claim 11, wherein
the security device includes:
   a decrypter that decrypts the security challenge via a private key of a public-private key pair that is associated with the receiving device to form the security response.

14. The receiving device of claim 13, wherein
the security device is further configured to communicate a certification of the receiving device to the check-out/check-in device to enable the check-out/check-in device to provide the content material to the receiving device, and
the certification of the receiving device includes a public key of the public-private key pair of the receiving device.

* * * * *